(12) United States Patent
Karmhag et al.

(10) Patent No.: US 7,952,785 B2
(45) Date of Patent: May 31, 2011

(54) MANUFACTURING OF ELECTROCHROMIC DEVICES

(75) Inventors: Richard Karmhag, Uppsala (SE); Greger Gustavsson, Uppsala (SE); Claes Goran Granqvist, Uppsala (SE); Andris Azens, Uppsala (SE)

(73) Assignee: Chromogenics Sweden AB, Uppsala (SE)

( * ) Notice: Subject to any disclaimer, the term of this patent is extended or adjusted under 35 U.S.C. 154(b) by 224 days.

(21) Appl. No.: 12/375,472

(22) PCT Filed: Jul. 25, 2007

(86) PCT No.: PCT/SE2007/050534
§ 371 (c)(1),
(2), (4) Date: Apr. 28, 2009

(87) PCT Pub. No.: WO2008/013499
PCT Pub. Date: Jan. 31, 2008

(65) Prior Publication Data
US 2009/0316248 A1    Dec. 24, 2009

(30) Foreign Application Priority Data

Jul. 28, 2006   (SE) .................................... 0601622

(51) Int. Cl.
*G02F 1/15* (2006.01)
(52) U.S. Cl. ........................................ 359/265; 359/266
(58) Field of Classification Search ............ 359/265
See application file for complete search history.

(56) References Cited

U.S. PATENT DOCUMENTS

| | | | |
|---|---|---|---|
| 5,233,461 A | 8/1993 | Dornan et al. | |
| 5,859,723 A * | 1/1999 | Jodicke et al. | 359/270 |
| 6,118,573 A * | 9/2000 | Kubo et al. | 359/266 |
| 6,193,379 B1 | 2/2001 | Tonar et al. | |
| 6,211,995 B1 | 4/2001 | Azens et al. | |
| 6,232,019 B1 | 5/2001 | Wunder et al. | |
| 6,404,532 B1 | 6/2002 | Berneth et al. | |
| 6,500,287 B1 | 12/2002 | Azens et al. | |
| 6,952,299 B1 | 10/2005 | Fukazawa et al. | |

FOREIGN PATENT DOCUMENTS

| | | |
|---|---|---|
| EP | 1 048 973 | 11/2000 |
| JP | 2005-266185 | 9/2005 |
| WO | 98/13724 | 4/1998 |
| WO | 99/23528 | 5/1999 |

OTHER PUBLICATIONS

International Search Report dated Nov. 16, 2007, from corresponding PCT application.

* cited by examiner

*Primary Examiner* — Ricky L Mack
*Assistant Examiner* — James C Jones
(74) *Attorney, Agent, or Firm* — Young & Thompson

(57) ABSTRACT

A manufacturing method of electrochromic devices (10) includes the steps of providing a first and second sheet including a first (22) and second (24) plastic substrate, respectively, at least partially coated with a first (12) and second (14) electron conducting layer, respectively. The first sheet is at least partially coated with a first electrochromic layer (16). The second sheet is at least partially coated with a counter electrode layer (18). The first and second sheets are laminated with an electrolyte layer (20) interposed in-between into an electrochromic laminate sheet (30). The electrochromic device is at least partially defined by forming a seal (50) through the electrochromic laminate sheet (30) at a distance (D) from a peripheral edge (31). The distance (D) is preferably larger than the mean diffusion lengths of oxygen, water or an electrolyte component in the electrolyte during a predetermined time period.

20 Claims, 7 Drawing Sheets

MANUFACTURING OF ELECTROCHROMIC DEVICES

TECHNICAL FIELD

The present invention relates in general to manufacturing of electrochromic devices.

BACKGROUND

A typical electrochromic device comprises five superimposed layers deposited on one substrate or positioned between two substrates in a joined together configuration. The central part of the five-layer electrochromic stack is an ion conductor (electrolyte). The ion conductor is in contact with an electrochromic film, capable of conducting electrons as well as ions. On the other side of the ion conductor is an electron and ion conducting counter electrode film serving as an ion storage layer. The central three-layer structure is positioned between electron conducting layers. Such a device is colored/bleached by applying an external voltage pulse between the electron conducting layers on the two sides of the stack, causing the electrons and ions to move between the electrochromic layer and the counter electrode layer. Applications of electrochromic devices include architectural windows, information displays, light filters and modulators, rearview mirrors, sunroofs and windows in vehicles, eyewear, helmet visors, ski goggles, surfaces with variable thermal emissivity or camouflage.

Historically, the first electrochromic coatings were deposited on glass substrates. The possibility of using plastic substrates is described, for example, in WO9923528. Electrochromic devices on plastic substrates are characterized by their light weight, flexibility, and the ease of cutting to complex shapes.

A typical procedure for manufacturing of electrochromic devices with two substrates comprises the following steps. First, two substrates are provided.

Each substrate is coated by an electron conducting layer and an electrochromic alternatively a counter electrode layer. The coated substrates are typically cut to their final size and shape. Secondly, the two substrates are joined together with an electrolyte layer interposed between the substrates. A hermetic sealing to the device edges is provided. Finally, means of electrical contacting are applied so as to connect the electrochromic device to the power supply.

There are many prior art disclosures presenting different types of sealing procedures. Just a few examples will be presented here. WO 9923528 discloses a thermal hardening, photochemical hardening or photochemically initiated thermal hardening epoxy adhesive applied to the edges of electrochromic devices with glass or plastic substrates.

U.S. Pat. No. 6,952,299 discloses electrochromic devices sealed by a liquid-state sealing resin applied to the outer circumferential edge of a laminated structure and cured to seal the laminated structure, so the entire structure is made into a body.

JP 2005266185 discloses plastic sheets, disposed on both surfaces of a dimming layer comprised of a photochromic material, thermochromic material or electrochromic material that changes in state according to external stimulation. The edges of the sheets are sealed by ultrasonic welding in order to eliminate the need for adhesives and bonding in unnecessary regions. The method describes welding of individual pre-cut devices having a periphery with a bare plastic welding area.

U.S. Pat. No. 6,193,379 discloses an electrochromic assembly including a front and/or rear elements made of aliphatic hydrocarbons. A transparent conductive material layer is disposed on the rear surface of the front element, and another layer on the front surface of the rear element. The elements of pre-cut size and shape are joined to form a chamber containing electrochromic material in solution with the organic solvent. The front and rear elements may be joined by a thermal, ultrasonic, or laser weld, or by an epoxy seal. The sealing area is an uncoated part of bare front or rear elements.

SUMMARY

A general problem with prior art manufacturing of electrochromic devices is that a periphery of the device is exposed to any gas atmosphere or vacuum to a larger extent than a middle part, due to diffusion into or out of the electrolyte before the edges are sealed. Such diffusion may cause the device periphery to present different properties than the middle part. Another general problem is that there is a tendency for delamination of the substrates by the very edges before the sealing is completed. A further problem is that many prior art manufacturing methods are not well-compatible with industrial production volumes. For instance, sealing based on adhesives often requires an additional step of sealant curing. Further problems with some prior art manufacturing methods are that the provision of the seal often adds substance to the thickness of the device and in many cases also produces a non-functioning or badly functioning part along the periphery.

A general object of the present invention is therefore to provide an improved method for manufacturing of electrochromic devices. A further object of the present invention is to prevent diffusion induced property differences in electrochromic devices. Yet a further object of the present invention is to prevent delamination of the substrates upon production. Yet a further object of the present invention is to produce electrochromic devices having a uniform thickness also at the edges and also being functional essentially all the way to the edge.

The objects presented here above are achieved by manufacturing methods and devices according to the present claims. In general words, a manufacturing method of electrochromic devices comprises the steps of providing a first and second sheet comprising a first and second plastic substrate, respectively, at least partially coated with a first and second electron conducting layer, respectively. The first sheet is further at least partially coated with a first electrochromic layer. The second sheet is further at least partially coated with a counter electrode layer. The first and second sheets are laminated with an electrolyte layer interposed in-between into an electrochromic laminate sheet. The electrochromic device is at least partially defined by forming a seal through the electrochromic laminate sheet at a distance from a peripheral edge. An interior portion of the electrochromic device, in the lateral direction, thereby obtains a size smaller than the first and second sheets. The distance is preferably larger than the mean diffusion lengths of oxygen, water or an electrolyte component in the electrolyte during a predetermined time period. The method preferably also comprises the step of cutting away a part of the electrochromic laminate sheet in conjunction with or after the defining step.

In preferred embodiments, the seal is formed in a substantially closed path and preferably, the cutting step is performed essentially along the seal. An electrochromic device, smaller than the first and second sheets, can thereby be released. If the defining step is performed along a multitude of closed paths, a multitude of electrochromic devices are produced from one single electrochromic laminate sheet. The defining step is preferably performed by local heat generation in the electrochromic laminate sheet, preferably by ultrasonic or laser welding.

One advantage with the present invention is that manufacturing of electrochromic devices can be performed without having its periphery exposed to any gas atmosphere or vacuum to a larger extent than the middle part. Another advantage is that delamination is prevented. The electrochromic devices produced by the method according to the present invention provide a narrow, mechanically strong joint of the substrates within the same thickness as the main device thickness. The method is furthermore well compatible with industrial production volumes.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosures, equal or directly corresponding features in different figures and embodiments will be denoted by the same reference numbers.

Electrochromic materials are in the present disclosure defined as materials that are able to change their optical properties, persistently and reversibly, under insertion/extraction of ions and electrons. An electrochromic layer is subsequently a layer comprising an electrochromic material.

Figure 1:
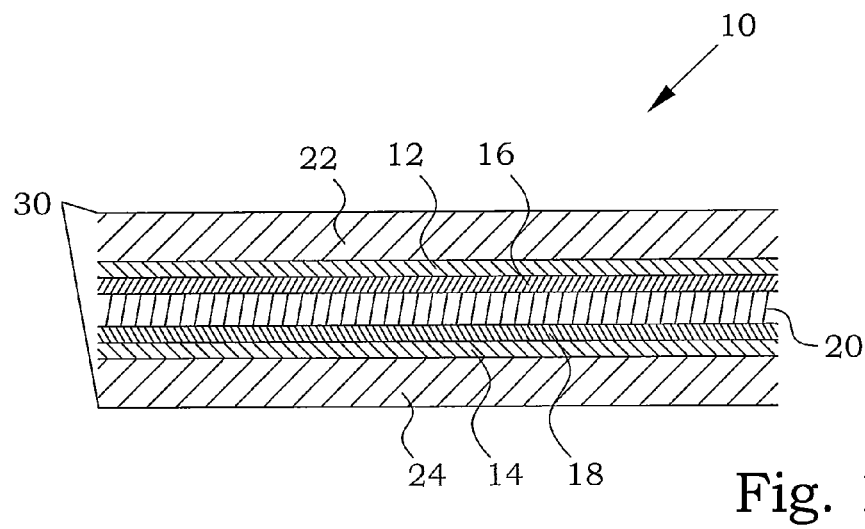
FIG. 1 is schematic illustration of a typical composition of an electrochromic device.

FIG. 1 illustrates a typical configuration of an electrochromic device 10. In the centre part, an ion conductor, i.e. an electrolyte layer 20 is provided. The electrolyte layer 20 is on one side in contact with an electrochromic layer 16, capable of conducting electrons as well as ions. On the other side of the ion conductor 20 is an electron and ion conducting counter electrode layer 18, serving as an ion storage layer. This counter electrode film 18 may entirely or partly be constituted by a second electrochromic film. The central three-layer structure 16, 18, 20 is positioned between electron conducting layers 12, 14. The electron conducting layers 12, 14 are arranged against outer substrates, in the present invention a first 22 and a second 24 plastic substrate. The stack of the plastic substrates 22, 24 and the central five layers 12, 14, 16, 18, 20 forms an electrochromic laminate sheet 30.

Such an electrochromic device 10 is colored/bleached by applying an external voltage pulse between the electron conducting layers 12, 14 on the two sides of the stack 30, causing the electrons and ions to move between the electrochromic layer 16 and the counter electrode layer 18. The electrochromic layer 16 will thereby change its color. Non-exclusive examples of electrochromic layers 16 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

At least one of the plastic substrates 22, 24 has to be transparent, in order to reveal the electrochromic properties of the electrochromic layer 16 to the surroundings. In a typical case today, plastic substrates are used. In the most general sense, a plastic substrate 22, 24 is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers Also at least one of the two electron conducting layers 12, 14 must be transparent. Non-exclusive examples of electron conductors 12, 14 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well. Depending on the particular application, one or both electron conductor layers 12, 14 may be made of a metal grid.

As mentioned above, a counter electrode layer 18 may comprise electrochromic materials as well as non-electrochromic materials. Non-exclusive examples of counter electrode layers 18 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films e.g. of oxides based on vanadium and/or cerium as well as activated carbon. Also combinations of such materials can be used as a counter electrode layer 18.

The electrolyte layer 20 comprises an ion conductor material. The electrolyte layer 20 may be transparent or non-transparent, colored or non-colored depending on the application. Examples of suitable ion conductors can be found in many prior art documents, e.g. U.S. Pat. No. 6,232,019. Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of $TiO_2$, silica or other oxides. Some non-exclusive examples of lithium salts used are LiTFSI [lithium bis(trifluoromethane)sulfonimide], $LiBF_4$ [lithium tetrafluoroborate], $LiAsF_6$ [lithium hexafluoro arsenate], $LiCF_3SO_3$ [lithium trifluoromethane sulfonate], and $LiClO_4$ [lithium perchlorate].

Note that the relative thicknesses of the layers in the different figures in the present disclosure do not represent the true relationship in dimensions. Typically, the substrates are much thicker than the other layers. The figures are drawn only of the purpose to illustrate connection principles, not to give any dimensional information.

Figure 2:
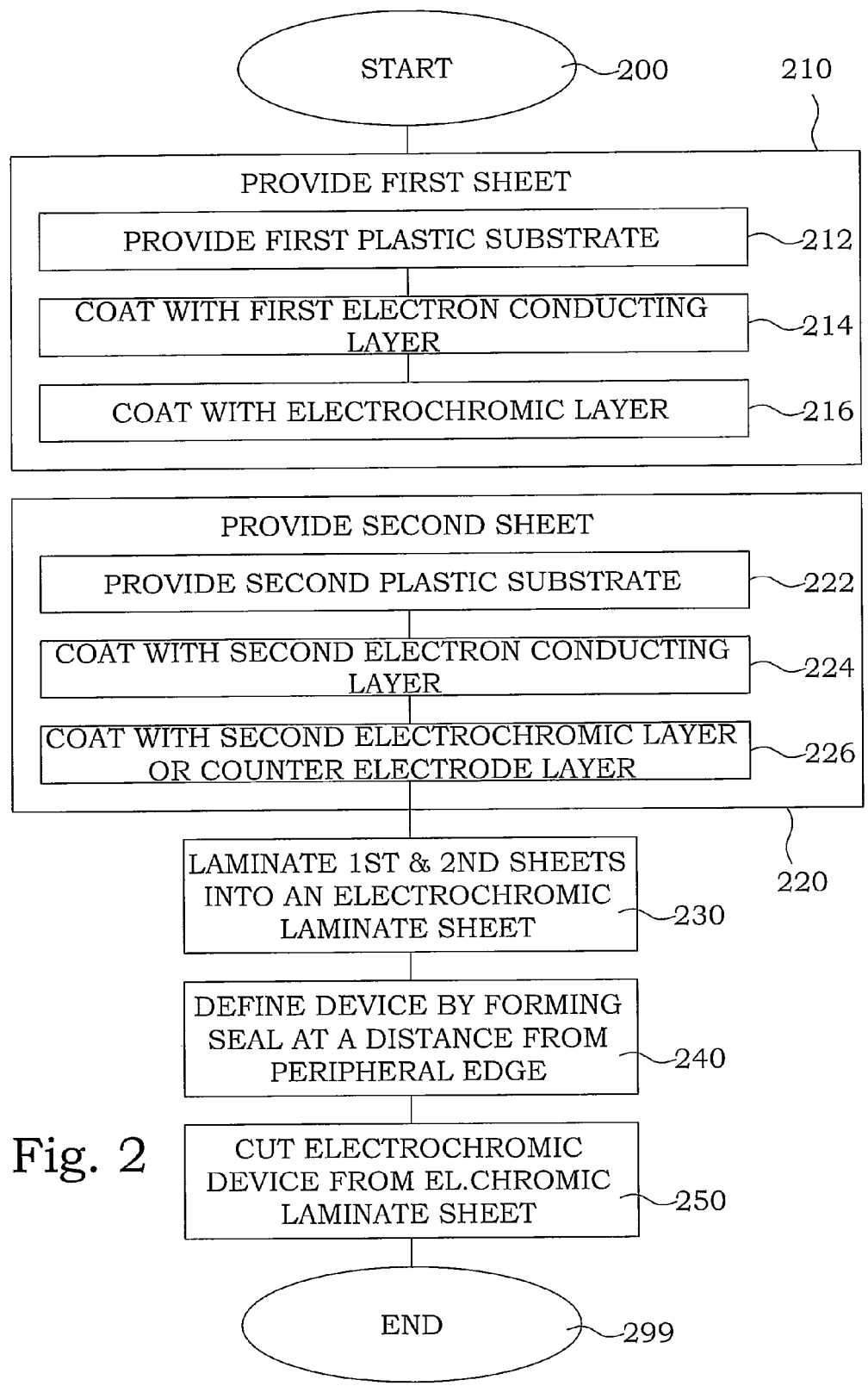
FIG. 2 is flow diagram of main steps of an embodiment of a method according to the present invention.

FIG. 2 illustrates a flow diagram of main steps of an embodiment of a manufacturing method according to the present invention. This is only one particular embodiment of the manufacturing method, and anyone skilled in the art realizes that additional steps may be incorporated where necessary. The procedure starts in step 200. In step 210, a first sheet is provided, preferably by the substeps 212, 214 and 216. In step 212, a first plastic substrate is provided. The first plastic substrate is at least partially coated with a first electron conducting layer in step 214 and with an electrochromic layer in step 216, together forming the first sheet.

In step 220, a second sheet is provided, preferably by the substeps 222, 224 and 226. In step 222, a second plastic substrate is provided. The second plastic substrate is at least partially coated with a second electron conducting layer in step 224 and with a counter electrode layer in step 226, together forming the second sheet.

The steps 214, 216, 224, 226 of coating the first and second plastic substrates with the first and second electron conducting layers and the electrochromic/counter electrode layers, respectively, can be performed by virtually any thin film deposition technique that provides films with required properties. Magnetron sputter-deposition is a widely used technique, compatible with industrial production volumes and high layer quality. A list of other non-exclusive possible techniques includes thermal or electron beam evaporation, spray pyrolysis, sol-gel deposition, pulsed laser deposition, electrodeposition, chemical vapor deposition and dip coating.

Continuous non-patterned layers are generally simplest to make. However, coating of substrates by e.g. sputter-deposition also allows for deposition of layers of different shapes by for example simple masking techniques. In such a way, any geometrical configuration of the first and second electron conducting layers and the electrochromic/counter electrode layers can be achieved. Other alternatives for creating different geometrical configurations of the layers are as such also present in prior art.

Step 210 and 220 may also comprise further steps. For instance, after provision of the substrate (step 212), this may e.g. be pre-treated before coating. Also, after deposition (steps 214, 216, 224, 226), the layers may undergo pre-treatment prior to incorporation in any laminate sheet, for example, such as disclosed in U.S. Pat. No. 6,500,287. Furthermore, as indicated above, additional layers, such as bus bars or additional layers added for chemical compatibility reasons, such as disclosed in U.S. Pat. No. 6,211,995, may be included in the thin film stack as well.

In step 230, the two substrates are joined together, with an electrolyte layer interposed between the substrates. The electrolyte may be applied onto one or both substrates by screen printing, spraying, spin coating, or by dispensing lines that are roll-pressed upon lamination to form a uniform ion conductor layer in the middle of the laminated structure. An electrochromic laminate sheet having a corresponding size to the original first and second plastic substrates is thus formed.

According to the present invention, in step 240, a major part of an interior portion, in the lateral direction, of an electrochromic device is defined by forming a seal. By lateral direction is meant the direction along a surface of the electrochromic device. The seal is a hermetic seal through the electrochromic laminate sheet, providing a mechanically strong joint of the substrates. In the present disclosure, the term "sealing" is used in the meaning of "providing a hermetic joint". The seal is chemically inert to all layer materials comprised in the device, in particular, to the electrolyte. The seal is formed at a distance from a peripheral edge of the electrochromic laminate sheet, which gives the interior portion a size that is smaller than the first and second sheets. By forming the seal at a distance from the peripheral edge of the electrochromic laminate sheet, diffusion related property changes within the interior portion are reduced. Preferably, the distance is larger than a diffusion length of oxygen, water or any of the components of the electrolyte during a predetermined time period characteristic of a typical time elapsing between the laminating step and the defining step.

The manufacturing method of the present invention relies on that the sealing must be compatible with the plastic substrates and the layer structure between the substrates. This ensures the necessary quality of the devices. In a preferred embodiment, the seal is accomplished by local heat generation in the electrochromic laminate sheet. Therefore, no additional step of sealant curing is necessary in the device manufacturing process. Preferable sealing techniques are ultrasonic welding or laser welding. A welded edge provides a mechanically strong joint of the substrates. Furthermore, the welding area is of virtually zero width. With the welding done through the transparent conductor, the electrochromic, the counter electrode and the electrolyte layers, an electrochromic device can be obtained that does not have a non-functioning part along the periphery. These techniques will be discussed in somewhat more detail further below.

The seals produced by ultrasonic welding or laser welding do not significantly limit the flexibility of the electrochromic device. The welding does neither add to the thickness of the electrochromic device. Upon mounting a thin laminated plastic electrochromic device into a frame, or laminating the device in the middle of a more complex structure, such as a laminated glass pane, it is an advantage if the edge sealing does not add to the thickness of the device, i.e., the edge is not made thicker than the rest of the device.

Furthermore, the width of the seal is indeed very narrow, in most applications negligible. This makes it possible to achieve an electrochromic device functioning over the entire interior portion, all the way out to the seal. This is important for small size electrochromic devices used in miniature technical applications, or for consumer products where the electrochromic device edges cannot efficiently be hidden. It is also important in many applications that the edge sealing does not add to the lateral size of the device, i.e. that the device does not have a non-functioning part along the periphery.

The embodiment of FIG. 2 further involves the step of cutting away at least a part of the electrochromic laminate sheet. This step is performed in conjunction with or after the defining step. In other words, the sealing of the electrochromic device is performed before or simultaneously as the cutting of the electrochromic laminate sheet. This is for ensuring that the new edge formed by the cutting does not introduce any detrimental diffusion.

According to one embodiment of the present invention, the outer shape and size of the final electrochromic device is provided at the earliest in connection with the provision of the seal. This determines the order of the defining and cutting step. First, the device is sealed, then cut out. This is in sharp contrast to at least most prior art methods, where the final shape of the electrochromic device is formed by cutting the original sheets or the laminate sheet and a seal along the edge of the cut-out piece then is provided.

The present manufacturing method relies on that the cutting must be compatible with the plastic substrates and the layer structure between the substrates. This in turn ensures the necessary quality of the devices and opens up for volume manufacturing of the electrochromic devices. Examples of suitable cutting methods are discussed in more detail further below.

The present manufacturing method may also comprise additional steps e.g. for applying means of electrical contacting so as to connect the device to the power supply.

The manufacturing method according the embodiment of FIG. 2 ends in step 299.

As mentioned before, additional steps may be added before, between or after the steps illustrated in FIG. 2. For instance, additional cutting steps can be included also earlier in the procedure, as long as the defining of the electrochromic device takes place at an appropriate distance from the peripheral edge. For instance, the first and second sheets may be provided in very large pieces, which e.g. may be wound up in a roll. A first cut of the first and second sheet may then provide laminate sheets that are much smaller than the originally provided sheets, but still larger than the final electrochromic devices. Also, after the lamination step, an additional cut into further smaller pieces may be performed before the actual defining step. However, the cutting, if any, into the final electrochromic device shape is performed after or simultaneous to the defining step.

Also, different post treatment steps can be feasible. In order to further improve the resistance against delamination and/or diffusion, an extra step of providing an additional seal after the final cutting can be used. For instance, sealing resin, e.g. epoxy resin or silicon based resin may be applied to the finally cut edge.

From the device quality point of view it is a major advantage, as mentioned further above, that a laminated electrochromic device can be produced, avoiding the diffusion of any substances in or out of device through open edges before the edges are sealed. Such diffusion may cause the device periphery to switch differently than the middle part, which is a critical quality issue.

Furthermore, upon handling of flexible laminates of prior art methods, there is a risk that the two substrates may delaminate by the very edges before the edges are sealed. Even a slight delamination may cause functional defects by the electrochromic device periphery. According to the present invention, the problem is avoided by producing the devices from the "bulk" part of the laminate, and sealing the device edges before the edges have become the periphery of the final electrochromic device.

According to one preferred embodiment of the present invention, the seal is formed by ultrasonic welding. The ultrasonic welding equipment typically consists of a generator, a converter connected to the generator by a HF cable, a booster, and a welding tool ending with a welding horn that comes into physical contact with the substrates upon the welding process. The welding horn is typically made of hardened steel or titanium.

The used ultrasound frequency is in the range of 20-100 kHz. Frequencies from the lower part of the range have the advantage of enabling more robust welding tools and more robust processes of welding. Description of ultrasonic welding can be found in general handbooks of plastics joining.

Preferably, the welding can be performed by a sharp welding horn. This may provide a narrow welding zone of virtually zero width. The edge of the welding horn is preferably sharp with an edge angle of less than 45 degrees. A sharper welding horn edge typically results in a narrower contact surface, i.e. welding area, between the two substrates and will expose the electrochromic laminate sheet to a minimal heating effect. However, with a less sharp welding horn edge the welding area is wider and the joint may be mechanically stronger.

When a welding line is drawn across and through the laminated sheet, the two laminated substrates are joined together and a seal is formed at the welding line. Simultaneous cutting of the device out of the laminated sheet is possible as well, which is discussed more in detail further below.

The quality of the sealed edges depends on the sharpness of the welding horn edge, but also on its orientation with respect to the surface of the laminated sheet. In one embodiment, the welding is performed by a sharp welding horn oriented essentially perpendicularly to the surface of the electrochromic laminate sheet. In such a case, the force between the welding horn and the electrochromic laminate sheet has to be controlled carefully, in order to avoid defects, e.g. small bubbles, generated inside the laminate on both sides of the welding line.

Figure 3:
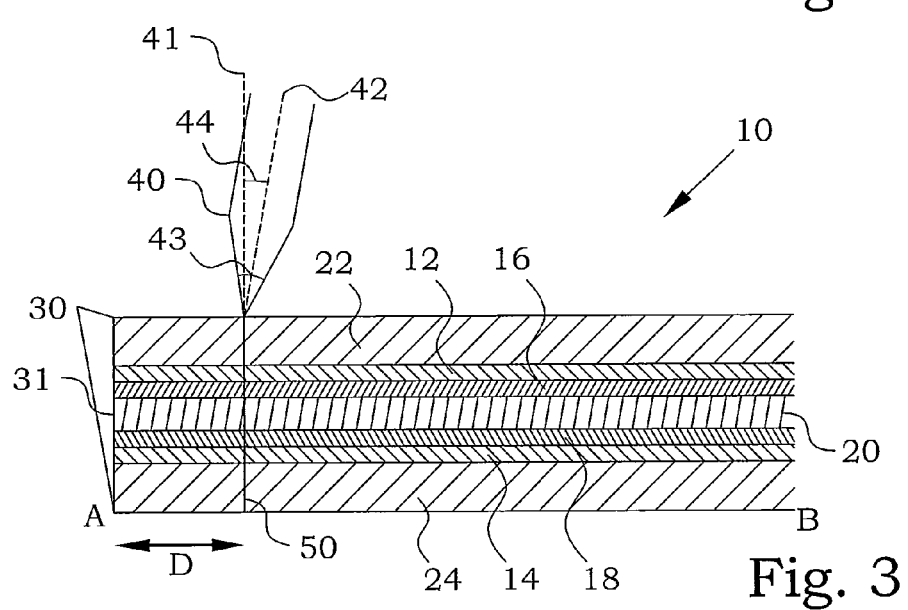
FIG. 3 is a schematic illustration of ultrasonic welding of an electrochromic laminate sheet according to one embodiment of the present invention.

According to another embodiment of the present invention, schematically illustrated in FIG. 3, the welding of the electrochromic laminate sheet 30 is performed by a sharp welding horn 40. The edge angle 43 of the welding horn 40 is in the present embodiment approximately 30 degrees, giving a seal 50 at a distance D from a peripheral edge 31 of the electrochromic laminate sheet 30, i.e. from a peripheral edge of the first sheet and from a peripheral edge of the second sheet. The welding horn 40 is tilted by an angle 44 of between 0 and 45 degrees relative to a surface normal 41 of the electrochromic laminate sheet 30. In other words, a main axis 42 of the welding horn 40 is displaced from the surface normal 41 by up to 45 degrees. The tilting direction is towards the interior of the electrochromic device, denoted by B in the figure. The area A is presumed to be situated outside the final device. Preferably, the tilting angle 44 is between 3-10 degrees. Such a tilting will typically produce an electrochromic device without defects generated inside B the seal 50. However, defects may instead be more prominent on the outside A.

When performing the welding, the welding line is drawn by a relative motion between the welding horn and the electrochromic laminate sheet. This can be achieved in different manners. In one particular embodiment, the welding horn is arranged in a stationary manner and the electrochromic laminate sheet is brought into a relative motion thereto. In another particular embodiment, the electrochromic laminate sheet is arranged in a stationary manner and the welding horn is instead brought into a relative motion thereto. In both cases, electrochromic devices of complex shapes can easily be produced by using standard means of providing XYZ motion.

Also, when devices with smaller size are to be manufactured, the whole edge may be welded simultaneously using a plate or "head" extending over the whole edge and oscillating against a fixed knife shaped as the contour of the device, instead of a small moving welding horn. The size is limited by the equipment used. The same technique can be applied for long patterns where the laminate can be moved repeatedly between subsequent weldings with the plate against a relatively long knife edge contour.

Ultrasonic welding is easily adaptable to different materials and thicknesses. The present manufacturing method for electrochromic devices does therefore not put any rigorous requirements on the thickness of the electron conductor layers, the electrochromic and the counter electrode layers in the electrochromic stack. Each layer thickness can therefore be designed entirely to fulfill the requirements on the device functioning.

As mentioned above, ultrasonic welding techniques can also be utilized for cutting purposes. In one embodiment of the present invention, the cutting is performed simultaneously (i.e. in direct conjunction) with the sealing. This can then be performed by the ultrasonic welding equipment itself.

If the welding horn is driven through the whole thickness of both substrates of the laminate, a cut is produced along the welding line. Such a cut will separate two sealed edges on the two sides of the welding line from each other.

The ultrasonic cutting can also be provided in a separate step after the ultrasonic sealing. Furthermore, in yet another embodiment, the cutting step is performed after the sealing step by other means than for ultrasonic welding.

The step of defining the interior of the electrochromic device comprises the forming of a seal. Preferably, this seal surrounds as much as possible of the electrochromic device, ideally around the whole periphery of the device. However, in certain applications, other sealing techniques may be necessary e.g. for areas around electrical leads etc. It is also preferred if the cutting of the electrochromic device is performed along the seal, so as to minimize the lateral size. However, in certain applications, it may be of benefit to save some material outside the seal, e.g. for mounting support.

One evident feature of the present invention is that the produced electrochromic devices have interior areas that are smaller than the originally provided laminated sheet. This may be a slight disadvantage, since material outside the seal may be wasted. However, the approach instead opens up for giving a good compatibility with industrial production volumes. By defining more than one electrochromic device on a single laminated sheet, a multitude of devices can be produced from a single pair of substrates. This is easily adopted for automatic handling of large laminates, from which a large number of electrochromic devices can be formed.

The upper size limit of the electrochromic laminate sheet is set by the size of the plastic substrates coated by the electron conductor and the electrochromic or counter electrode layer. The two plastic substrates may be, for example, two plastic rolls coated in a roll coater and laminated together without being cut into smaller portions. Electrochromic devices can thereby be manufactured in a quasi-continuous manner, sealing and cutting out the devices from a very long electrochromic laminate sheet that is produced successively. In such a way, very large electrochromic devices may be produced, where the sealing and cutting steps of one end of the electrochromic device may start before the lamination of the other ends is even begun.

The lower size limit is that the electrochromic laminate sheet should cover at least one electrochromic device.

The present manufacturing method does not put any absolute restrictions e.g. on flatness. The seal is in a typical case produced at a flat laminated sheet, where a relative motion between e.g. an ultrasonic welding horn and the electrochromic laminate sheet is a two-dimensional motion. However, if a curved laminated sheet, single or double bent, is provided, the defining of the interior of the electrochromic device can easily be provided by moving the ultrasonic welding horn according to a three-dimensional path along the surface of electrochromic laminate sheet.

According to another preferred embodiment of the present invention, the seal is formed by laser welding. The laser welding can be performed with e.g. a $CO_2$ laser. In most equipment it is possible to adjust the laser parameters in order to optimize the quality of the weld. Often it is possible to choose between raster or vector cutting, or a combination of both. Other typical parameters that can be varied are speed, power, frequency and resolution. Excellent welding has been achieved with both 10 W and 25 W $CO_2$ lasers from Synrad.

When sealing plastics with laser welding smoke is always generated, the amount of smoke depends on type of plastic and thickness. To protect the surface from the smoke a protective film can be applied to the electrochromic foil prior to laser welding. The contamination from the smoke can also be removed in a separate cleaning step.

There are many advantages with laser welding compared to other sealing methods. It can be performed at high speed and results in a very clean and aesthetic joint with virtually zero width. No bubbles or other defects in the electrochromic foil are created by laser welding.

In certain applications, a joint as produced by only laser welding may be too weak, in particular when edges of the ECD may be exposed to mechanical forces. Therefore, in one embodiment, a seal produced by laser welding, typically as produced jointly with a cutting step, is reinforced by conventional sealing techniques, such as provision of adhesives. The advantages of the basic defining and cutting of the present invention can thereby be combined with strong joints as produced by prior art methods.

Also other techniques for providing local heat generation in the electrochromic laminate sheet may be used in the present invention, depending on the actual application and composition and thickness of the electrochromic laminate sheet.

Below, a number of examples will follow, illustrating some different variations in different parameters.

A laminated sheet 30 according to a first example is produced according to the laminate structure as shown in FIG. 1. Prior to lamination, two polyester substrates 22 and 24, in the present embodiment 175 micrometer thick and 35 cm×35 cm large, are provided. The first substrate 22 is coated by an electron conducting layer 12 of ITO, typically 50-400 nm thick, and an electrochromic layer 16 of hydrogen-containing tungsten oxide, typically 50-1000 nm thick, with the luminous transmittance in this embodiment below 60%, preferably below 50%. Both the layers 12 and 16 are deposited by magnetron sputtering.

Figure 4:
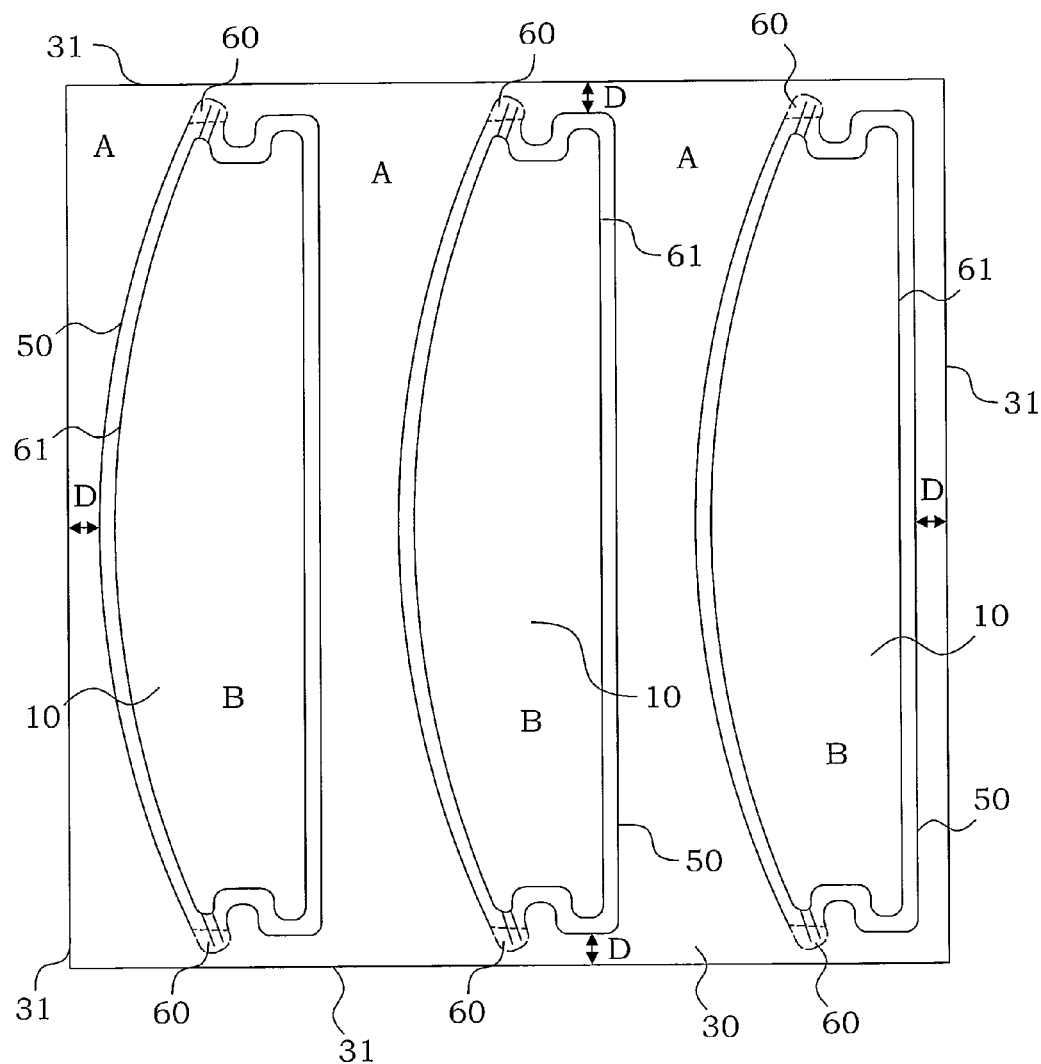
FIGS. 4, 6, 10 and 11 are schematic top views of embodiments of electrochromic laminate sheets, before cutting, used in manufacturing according to the present invention.

A top view of the laminated sheet 30 before cutting is illustrated in FIG. 4, and references will be made to both FIG. 1 and FIG. 4 concerning the present example. The electron conducting layer extends over the whole substrate 22. In the present embodiment an area 60 of ITO is left uncoated by the tungsten oxide for later contacting purposes. Moreover, a bus bar 61, not shown in the cross section view of FIG. 1, may be included in the structure. The bus bar may be positioned either between the first substrate 22 and the electron conducting layer 12, or between the electron conducting layer 12 and the electrochromic layer 16.

The second substrate 24 is coated by an electron conducting layer 14 of ITO, typically 50-400 nm thick, and a counter electrode layer 18 of nickel-based oxide, typically 50-1000 nm thick. Both the layers 14 and 18 are deposited by magnetron sputtering. The electron conducting layer 14 extends over the whole substrate 24. In the present embodiment, an area 60 of ITO is left uncoated by the nickel-based oxide for later contacting purposes. Furthermore, in the present embodiment, a bus bar 61 not shown in the cross sectional view of FIG. 1, may be included in the structure. The bus bar 61 may be positioned either between the second substrate 24 and the electron conducting layer 14, or between the electron conducting layer 14 and the counter electrode 18.

The second substrate 24 coated with the nickel-based oxide layer 18 is exposed to pretreatment, such as the one disclosed in U.S. Pat. No. 6,500,287, reducing the luminous transmittance of the layer 18 to typically less than 50%, preferably to less than 30%.

A line of a PMMA-based electrolyte 20 is dispensed on one substrate 22 or 24, and both substrates 22, 24 are laminated together by roll-pressing to form a laminated sheet 30 with a continuous layer 20 of electrolyte. The electrolyte layer 20 is typically 1-100 micrometer thick in the middle of the laminate sheet 30. Alternatively, the electrolyte 20 may be applied by screen printing or spraying.

The electrochromic laminate sheet 30 is placed on a flat surface, and three electrochromic devices 10 are defined by forming seals 50 through the electrochromic laminate sheet 30 and are cut out from the electrochromic laminate sheet 30 by an ultrasonic welding horn. The sealing and cutting is in the present embodiment performed simultaneously along the welding line 50 through both substrates 22 and 24 and all intermediate layers 12, 14, 16, 18, 20. For contacting purposes, the area 60 may be coated, sealed and cut in a different way, falling outside the main scope of the present invention.

The devices 10 are sealed simultaneously as they are cut out from the electrochromic laminate sheet 30 and do have functioning areas all the way out to the periphery. It is not self-evident that ultrasonic welding through all functional layers, including the transparent electron conducting layers 12, 14, would not short-circuit the devices 10 electrically. It has been confirmed in tests, however, that even relatively thin layers of electrochromic coatings 16 and electrolyte 20 are sufficient to prevent the electrical short-circuiting.

In the present embodiment, the thickness of the substrates 22, 24 has been adapted to commercially available PET and the lateral size has been adapted to a specific sputter-deposition unit.

As an alternative, laser welding can, as discussed further above, be used for sealing and cutting purposes.

Figure 5:
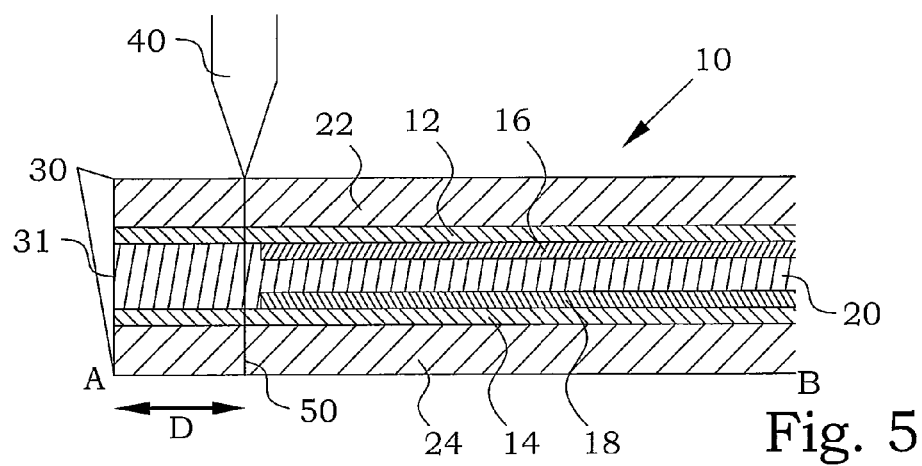
FIGS. 5, 7, 8 and 9 are schematic illustrations of composition configurations of embodiments of an electrochromic laminate sheet useful in manufacturing according to the present invention.
Figure 6:
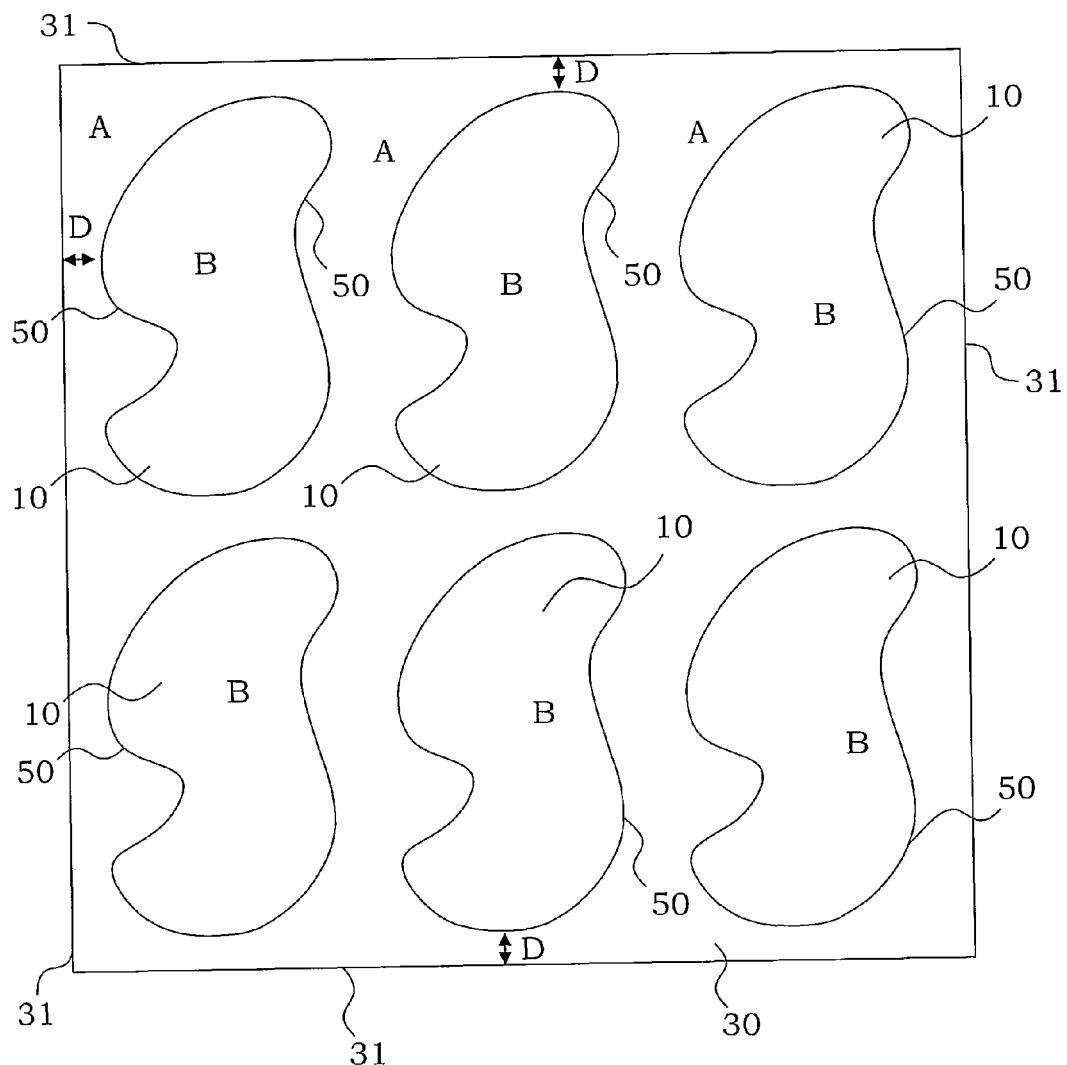

A laminated sheet 30 according to a second example is produced according to a laminate structure as shown in FIG. 5. A top view of the laminated sheet 30 before cutting is illustrated in FIG. 6, and references will be made to both FIG. 5 and FIG. 6 concerning the present example. Characteristics that are in common with previous example will not explicitly be discussed again. Prior to lamination, two cellulose propionate substrates 22 and 24, 0.3 millimeter thick and 35 cm×35 cm large, are provided and coated essentially in the same manner as in the first example. In the present example, however, the electrochromic layer 16 is deposited by sputtering via a mask. The electrochromic layer 16 does therefore not cover the peripheral part of the intended electrochromic devices 10. The width of the uncovered area is equal to or larger than the width of the seal 50. Similarly, the counter electrode layer 18 is also deposited by sputtering via a mask, giving a coverage corresponding to the coverage of the electrochromic layer 16. The second substrate 24 is then pretreated as in the previous example.

In the present example, after the coating of the substrates, spherical spacer particles, 10 micrometer in diameter, are evenly dispensed onto the electrochromic layer 16 with a spray nozzle. The spacer particles 10 may for instance be plastic spacer particles. The lamination is then performed in the same manner as in the previous example. However, in the present example, the spherical plastic spacer particles ensure that the minimum thickness of the electrolyte layer is not below 10 micrometers.

As illustrated in FIG. 6, six electrochromic devices 10 are defined at the electrochromic laminate sheet 30 by simultaneous sealing and cutting by a welding horn 40. The welding will now take place through the substrates 22, 24, the electron conducting layers 12, 14 and the electrolyte layer 20. However, due to the sputtering via a mask of the electrochromic layer 16 and the counter electrode layer 18, these layers will not be involved in the seal.

In this embodiment, the thicknesses of the substrates have been adopted to commercially available cellulose propionate.

Figure 7:
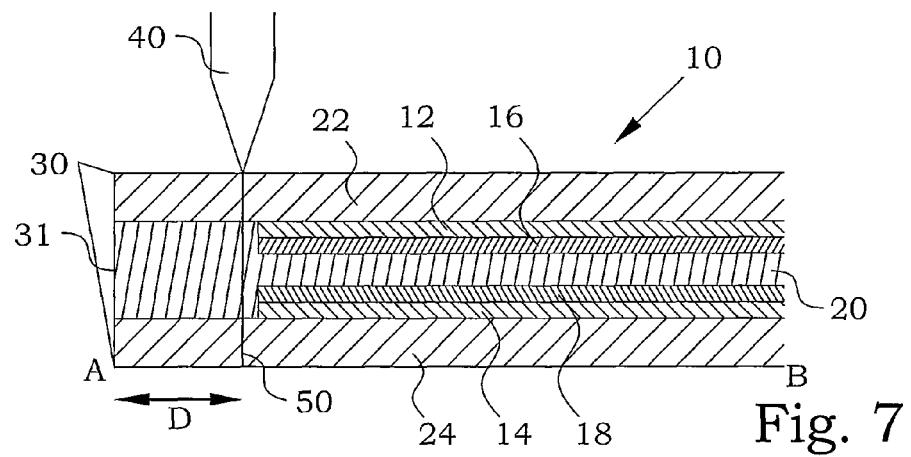

A laminated sheet 30 according to a third example is produced according to a laminate structure as shown in FIG. 7. A top view of the laminated sheet 30 before cutting can still be illustrated by FIG. 6, and references will be made to both FIG. 6 and FIG. 7 concerning the present example. Characteristics that are in common with previous examples will not explicitly be discussed again. Prior to lamination, two cellulose propionate substrates 22 and 24, 175 micrometer thick and 35 cm×35 cm large, are provided and coated essentially in the same manner as in the first example. In the present example, however, both the electrochromic layer 16 and the electron conducting layer 12 are deposited by sputtering via a mask. The electrochromic layer 16 and the electron conducting layer 12 do therefore not cover the peripheral part of the intended electrochromic devices 10. The width of the uncovered area is equal to or larger than the width of the seal 50. Similarly, the counter electrode layer 18 and the electron conducting layer 14 are also deposited by sputtering via a mask, giving a coverage corresponding to the coverage of the electrochromic layer 16. The second substrate 24 is then pretreated as in the previous example.

The layer structure is practical to produce in a production line where the electron conducting layers 12, 14 and the electrochromic (or the counter electrode) layers 16, 18 are deposited in the same vacuum cycle by sputter-coating via the same mask, where the mask simultaneously fulfills the function of fixing the plastic sheet 22, 24 to a substrate holder.

The electrochromic laminate sheet 30 is produced according to the principles of the first example.

As illustrated in FIG. 6, six electrochromic devices 10 are defined at the electrochromic laminate sheet 30 by simultaneous sealing and cutting by a welding horn 40. The welding will now take place through the substrates 22, 24 and the electrolyte layer 20. However, due to the sputtering via a mask of the electron conducting layers 12, 14, the electrochromic layer 16 and the counter electrode layer 18, these layers will not be involved in the seal. It has been discovered that welding and cutting through the electrolyte layer 20 does not cause any negative effects for device functioning. From a practical point of view, one of the advantages of present laminated structure 30 of FIG. 7 is that there is no need for producing a patterned electrolyte layer 20.

In this embodiment, the thicknesses of the substrates have been adopted to commercially available cellulose propionate.

Figure 8:
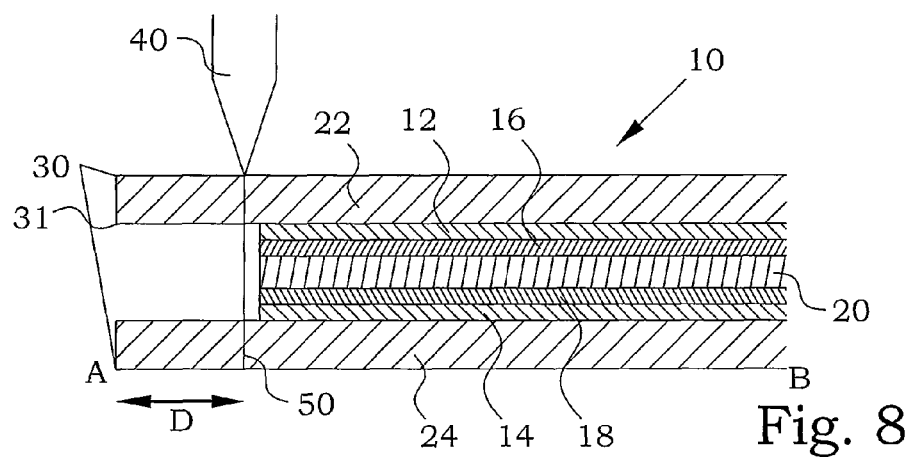

A laminated sheet 30 according to a fourth example is produced according to a laminate structure as shown in FIG. 8. A top view of the laminated sheet 30 before cutting can still be illustrated by FIG. 6, and references will be made to both FIG. 6 and FIG. 8 concerning the present example. Characteristics that are in common with previous examples will not explicitly be discussed again. Prior to lamination, two polyester substrates 22, 24 are provided as in the first example. The substrates 22, 24 are coated by electron conducting layers 12, 14, electrochromic layer 16 and a counter electrode layer 18 as in the third example. The counter electrode layer 18 is pretreated as in previous examples.

A layer of PMMA-based electrolyte, typically 1-100 micrometer thick, is applied onto one substrate by screen printing, alternatively by spraying via mask, and both substrates are laminated together to form an electrochromic laminate sheet 30 with a layer of electrolyte 20 in the middle of the laminate 30.

As illustrated in FIG. 6, six electrochromic devices 10 are defined at the electrochromic laminate sheet 30 by simultaneous sealing and cutting by a welding horn 40. The welding will now take place through solely the substrates 22, 24. Due to the sputtering/spraying via a mask of the electron conducting layers 12, 14, the electrochromic layer 16, the counter electrode layer 18, and the electrolyte layer 20, these layers will not be involved in the seal.

Figure 9:
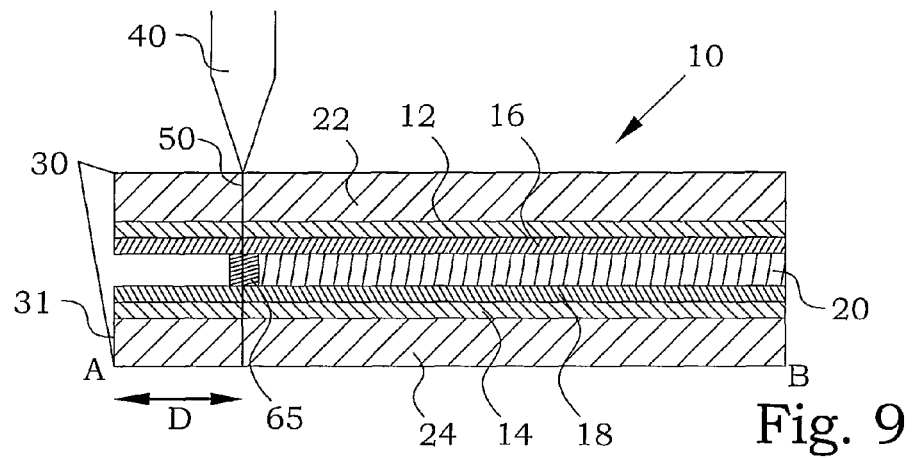
Figure 10:
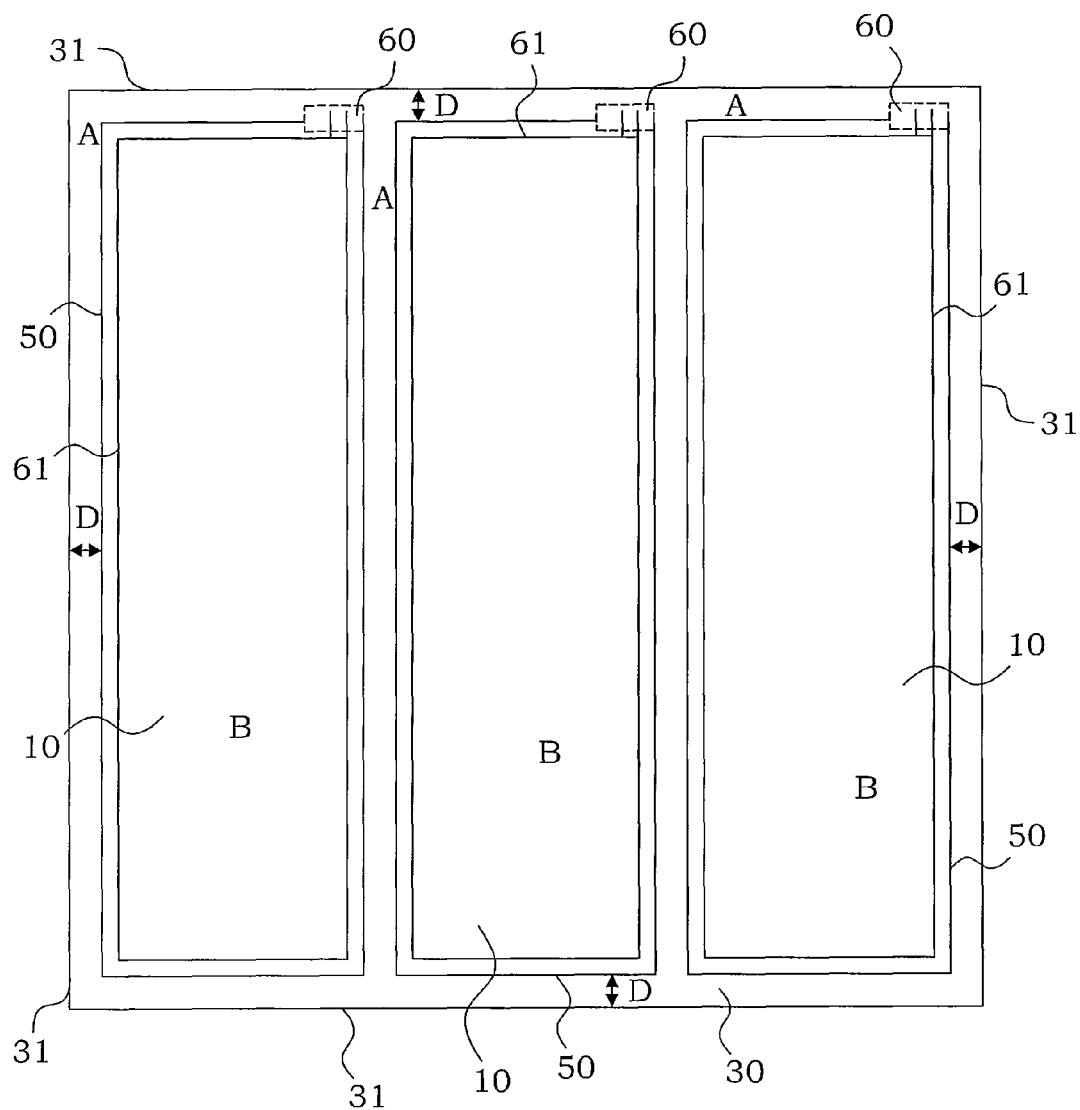

A laminated sheet 30 according to a fifth example is produced according to a laminate structure as shown in FIG. 9. A top view of the laminated sheet 30 before cutting can be illustrated by FIG. 10, and references will be made to both FIG. 9 and FIG. 10 concerning the present example. Characteristics that are in common with previous examples will not explicitly be discussed again. Prior to lamination, two polyester substrates 22, 24 are provided, 175 micrometer thick and 1 m×1 m large. The substrates 22, 24 are coated by electron conducting layers 12, 14, electrochromic layer 16 and a counter electrode layer 18 in a similar manner as in the first example. The counter electrode layer 18 is pretreated as in previous examples.

A spacer 65 is applied onto one of the substrates 22, 24, extending along the periphery of the intended electrochromic device 10.

An electrolyte layer 20 of PMMA is provided according to the masking principles presented in the fourth example. The spacer 65 is essentially conformal to the areas of the substrate 22, 24 that are uncovered by the electrolyte layer 20. The two substrates 22, 24 are laminated together to form an electrochromic laminate sheet 30 with a layer of electrolyte 20 in the middle of the laminate 30, encircled by the spacer 65.

The electrochromic laminate sheet 30 is placed on a flat surface, and three electrochromic devices 10 are defined by forming seals 50 through the electrochromic laminate sheet 30 and are cut out from the electrochromic laminate sheet 30 by a welding horn 40. The sealing and cutting is in the present embodiment performed simultaneously along the welding line 50 through both substrates 22 and 24, the intermediate layers 12, 14, 16, 18 as well as the spacer 65. It has been experimentally shown that welding and cutting through the spacer 65 provides a reliable sealing of the edges withstanding the requirements for electrochromic device functioning. For contacting purposes, the area 60 may be coated, sealed and cut in a different way, falling outside the main scope of the present invention.

Figure 11:
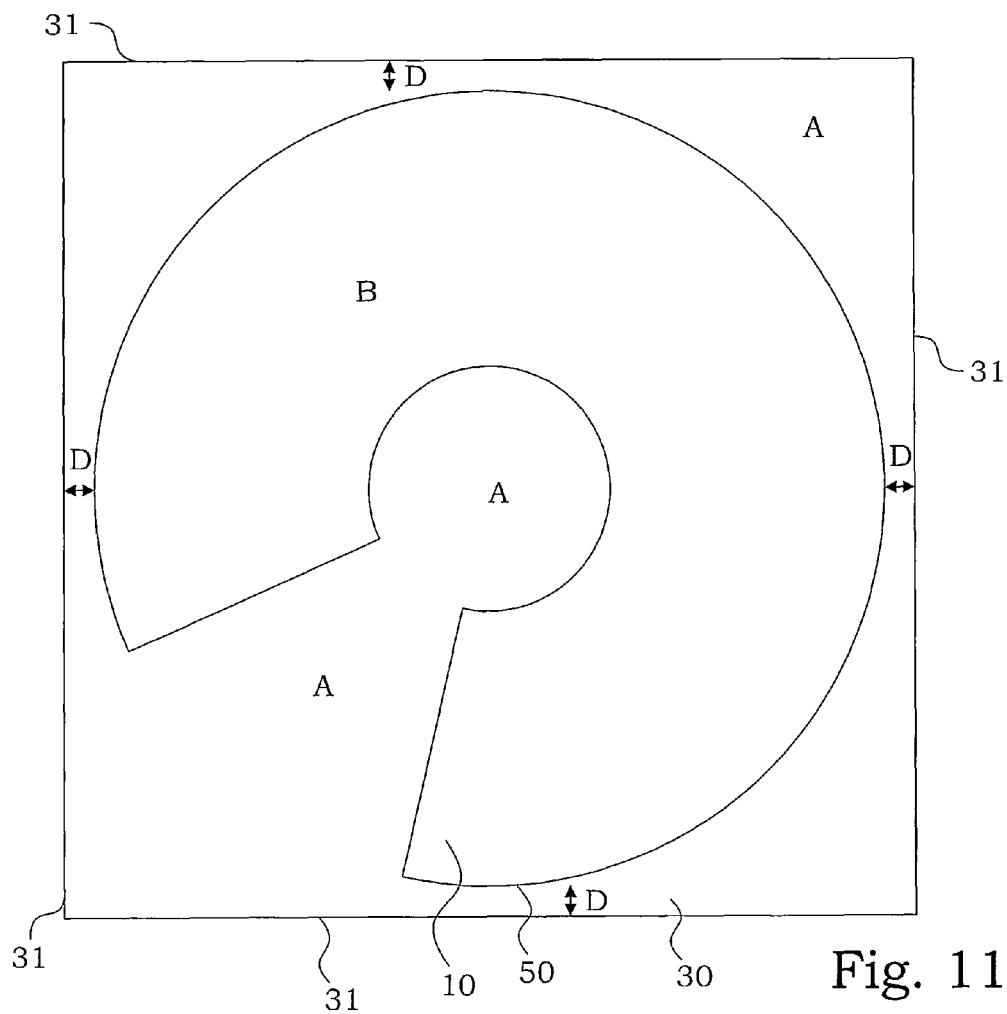

A laminated sheet 30 according to a sixth example is produced according to any of the laminate structures shown in FIGS. 3, 5, 7, 8 and 9. A top view of the laminated sheet 30 before cutting can be illustrated by FIG. 11. Characteristics that are in common with previous examples will not explicitly be discussed again. An electrochromic laminate sheet 30 is produced according to any of the preceding examples.

The laminate is placed on a flat surface, and the intended electrochromic device 10 is defined by forming a seal 50 enclosing the interior portion of the electrochromic device 10. The electrochromic device 10 is thereafter cut out from the electrochromic laminate sheet 30 by punching.

Figure 12:
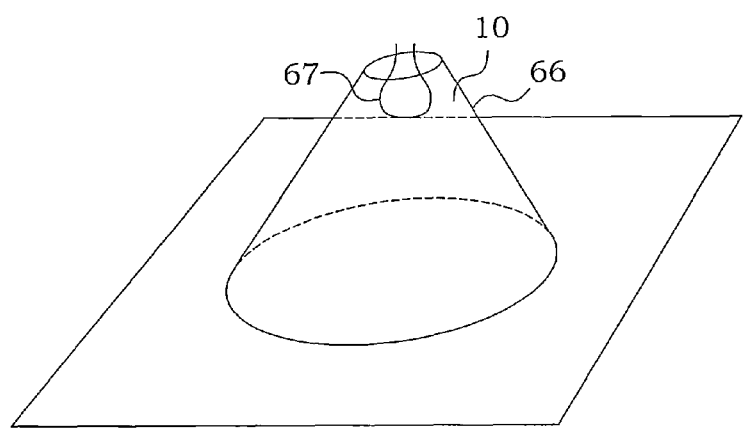
FIG. 12 is a schematic of an embodiment of a curved electrochromic device obtained from the electrochromic laminate sheet of FIG. 11.

The electrochromic device 10 can thereafter be formed into a shape of a frustum of a cone, as illustrated in FIG. 12. Such a device 10 may be used, for example, in a light source 67 with adjustable light intensity, where the electrochromic device 10 is placed on a surface of a reflector 66, instead of being put directly in front of the light source.

As can be seen from the present example, the present invention opens the way for tailoring electrochromic devices into complex shapes and 3-dimensional bodies.

In an alternative embodiment, an electrochromic laminate sheet 30 can be provided pre-shaped into a three-dimensional shape, i.e. in a curved and/or bent form. Defining and cutting steps can then be performed in three dimensions when the electrochromic laminate sheet 30 is supported by a surface having a corresponding geometry. In such a way, tensions in the electrochromic laminate sheet 30 caused by the post-sealing forming, can be avoided.

A laminated sheet 30 according to a seventh example is produced according to any of the laminate structures shown in FIGS. 3, 5, 7, 8 and 9. However, in this example, the electrolyte layer 20 is a pigmented non-transparent electrolyte. As before, the electrolyte layer is dispensed on one substrate, and both substrates are laminated together by roll-pressing to form the electrochromic laminate sheet 30 with a continuous layer of non-transparent electrolyte 20.

In the present example, the electrochromic device 10 can preferably be provided with seals and/or be cut out from the electrochromic laminate sheet 30 by laser welding. The non-transparency of the electrolyte 20 assists in generating heat from the laser radiation. Of course, ultrasonic welding will also be possible to use.

In use of an electrochromic device 10 according to the seventh example, the switching of the transparency properties of the electrochromic layer 16 will provide a change in optical appearance between dark and the color of the electrolyte layer 20. The electrochromic device 10 is therefore not transparent as a whole.

A laminated sheet 30 according to an eighth example is produced according to any of the laminate structures shown in FIGS. 3, 5, 7, 8 and 9. In this example, the first substrate 24 is coated by an electron conducting layer 14 consisting of aluminum, typically 50-200 nm thick. The deposition can be performed by almost any film deposition technique, but in the present example, magnetron sputtering is used. The nickel-based oxide layer 18 is exposed to pretreatment disclosed in U.S. Pat. No. 6,500,287, reducing the luminous transmittance of the counter electrode layer 18 to typically less than 50%, preferably to less than 30%.

Also here, the electrochromic devices 10 may be sealed and/or cut out from the electrochromic laminate sheet 30 by laser welding.

When using an electrochromic device 10 according to the eighth example, the switching of the transparency properties of the electrochromic layer 16 will provide a change in optical appearance between dark (a light absorbing surface) and a reflecting surface, caused by the aluminum coating.

In the above examples, the plastic substrates 22, 24 have been composed by polymers of equal composition and thickness. However, the present invention is not restricted to such situations. According to the present invention it is also possible to use plastic substrates 22, 24 of different materials. Also according to the present invention, the two plastic substrates 22, 24 in the laminate can have different thicknesses. A few non-exclusive examples could be:

175 micron polyester welded to 0.3 mm thick cellulose propionate.
125 micron polyester welded to 0.5 mm thick polycarbonate.
175 micron polyester welded to 0.75 mm thick cellulose acetate
0.5 mm polycarbonate welded to 0.3 mm thick cellulose propionate The specific shape, dimensions and number of electrochromic devices made from one laminated sheet in the above examples are only presented for illustration purposes. None of the dimensions is critical to or limiting the use of the present method of production of electrochromic devices. Therefore, electrochromic devices of other sizes and shapes can easily be made.

Other electrochromic layers than tungsten-based oxide, other counter electrode layers than nickel-based oxide, other electron conductors than ITO, and other ion conductors than PMMA-based polymers may be used, e.g. the examples mentioned in the beginning of the detailed description. Furthermore, other plastics may be used for substrates. Also, additional layers, such as disclosed in U.S. Pat. No. 6,211,995, may be included in the electrochromic stack. Additional coatings, such as anti-scratch, anti-fog, anti-reflection, diffusion barrier, photocatalytic, reflecting layers (specularly or diffusively reflecting), may be applied on the outside of the plastic substrates.

It can further be noticed, that the first and second sheets may not be perfectly conformal at the lamination step. One could for example provide a large first sheet against which a number of smaller second sheets are laminated. The edge of the laminate sheet will then be defined by the minimum overlapping area of the first sheet and the second sheet. In such a way, the peripheral edge of the laminate sheet may even be situated far inside the peripheral edge of one of the single sheets.

The embodiments and examples described above are thus to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

WO 9923528 (U.S. Pat. No. 6,404,532)
U.S. Pat. No. 6,952,299
JP 2005266185
U.S. Pat. No. 6,193,379
U.S. Pat. No. 6,211,995
U.S. Pat. No. 6,232,019
U.S. Pat. No. 6,500,287

The invention claimed is:

1. Method for manufacturing of electrochromic device, comprising the steps of:
   providing a first sheet comprising a first plastic substrate at least partially coated with a first electron conducting layer and a first electrochromic layer;
   providing a second sheet comprising a second plastic substrate at least partially coated with a second electron conducting layer and a counter electrode layer;
   laminating an electrolyte layer interposed between said first sheet and said second sheet into an electrochromic laminate sheet (30); and
   defining at least a major part of an interior portion, in a lateral direction, of at least one electrochromic device by forming a seal through said electrochromic laminate sheet at a distance from a peripheral edge of said first sheet and from a peripheral edge of said second sheet, thereby obtaining an interior portion of each one of said at least one electrochromic device having a size smaller than said first sheet and said second sheet.

2. Method according to claim 1, wherein said distance is larger than a largest one of mean diffusion lengths of:
   oxygen;
   water; and
   an electrolyte component;
in said electrolyte layer during a predetermined time period.

3. Method according to claim 1, wherein said step of defining comprises forming of a seal in a substantially closed path.

4. Method according to claim 1, comprising the further step of:
   cutting away at least a part of said electrochromic laminate sheet;
   whereby said cutting step is performed in conjunction with or after said step of defining.

5. Method according to claim 4, wherein said step of cutting away at least a part of said electrochromic laminate sheet is performed essentially along said seal formed by said step of defining.

6. Method according to claim 4, wherein said step of cutting is performed in a substantially closed path, thereby releasing an electrochromic device, having a size smaller than said first sheet and said second sheet, from remaining parts of said electrochromic laminate sheet.

7. Method according to claim 4, wherein said step of defining is performed along a multitude of closed paths, thereby defining a multitude of electrochromic devices, interior portions of which having sizes smaller than said first sheet and said second sheet.

8. Method according to claim 4, wherein said step of cutting is performed along a multitude of closed paths, thereby releasing a multitude of electrochromic devices, having sizes smaller than said first sheet and said second sheet, from remaining parts of said electrochromic laminate sheet.

9. Method according to claim 1, wherein said step of defining is performed by local heat generation in said electrochromic laminate sheet.

10. Method according to claim 9, wherein said step of defining is performed by ultrasonic welding.

11. Method according to claim 10, wherein said ultrasonic welding is performed by moving an ultrasonic horn along a surface of said electrochromic laminate sheet, whereby a centre line of said ultrasonic horn being tilted relative to a surface normal of said electrochromic laminate sheet.

12. Method according to claim 9, wherein said step of defining is performed by laser welding.

13. Method according to claim 4, wherein said steps of defining and cutting are performed jointly by ultrasonic welding of said electrochromic laminate sheet.

14. Method according to claim 13, comprising the further step of reinforcing said seal after said step of defining.

15. Method according to claim 4, wherein said steps of defining and cutting are performed jointly by laser welding of said electrochromic laminate sheet.

16. Method according to claim 15, comprising the further step of reinforcing said seal after said step of defining.

17. Method according to claim 1, wherein said step of defining is performed through said first plastic substrate, said second plastic substrate and at least one of:
   said first electron conducting layer;
   said second electron conducting layer;
   said electrolyte layer;
   said first electrochromic layer; and
   said counter electrode layer.

18. Method according to claim 1, comprising the further step of providing at least one of said first sheet and said second sheet with at least one additional layer.

19. Method according to claim 18, wherein said at least one additional layer is selected from the list of:
   bus bar;
   chemical compatibility layer;
   anti-scratch layer;
   anti-fog layer;
   anti-reflection layer;
   diffusion barrier;
   photocatalytic layer; and
   specularly or diffusively reflecting layer.

20. Electrochromic device, manufactured by a method according to the steps of:
provide a first sheet comprising a first plastic substrate at least partially coated with a first electron conducting layer and a first electrochromic layer;
providing a second sheet comprising a second plastic substrate at least partially coated with a second electron conducting layer and a counter electrode layer;
laminating an electrolyte layer interposed between said first sheet and said second sheet into an electrochromic laminate sheet (30); and
defining at least a major part of an interior portion, in a lateral direction, of at least one electrochromic device by forming a seal through said electrochromic laminate sheet at a distance from a peripheral edge of said first sheet and from a peripheral edge of said second sheet, thereby obtaining an interior portion of each one of said at least one electrochromic device having a size smaller than said first sheet and said second sheet.

* * * * *